: 2,951,073
Patented Aug. 30, 1960

2,951,073

PROCESS OF PREPARING PHENYL BENZO-γ-PYRONE COMPOUNDS SUBSTITUTED BY HYDROXYL GROUPS, AND PRODUCT

Ursula Kranen-Fiedler, Vancouver, British Columbia, Canada, and Richard Neu, Mannheim, Germany, assignors to Dr. Willmar Schwabe G.m.b.H., Karlsruhe-Durlach, Germany, a corporation of Germany No Drawing. Filed Aug. 30, 1957, Ser. No. 699,432

7 Claims. (Cl. 260—210)

The present invention relates to a process of preparing and purifying phenyl benzo-γ-pyrone compounds being substituted by hydroxyl groups and more particularly to the preparation and purification of such phenyl benzo-γ-pyrone compounds substituted by hydroxyl groups from shrubs of the hawthorn genus, i.e. of the genus Crataegus.

It is known to prepare phenyl benzo-γ-pyrone compounds substituted by hydroxyl groups from plant extracts by precipitating such benzo-γ-pyrone compounds which are substituted by hydroxyl groups in ortho-position in the phenyl ring attached to the benzopyrone ring system by means of neutral heavy metal salts, such as lead acetate. Thereby, the lead salts of such hydroxy phenyl benzo-γ-pyrones are precipitated and are freed of impurities. If other hydroxy derivatives of the above mentioned class of compounds are present in the extracts after separation of such ortho-hydroxy substituted phenyl benzo-γ-pyrone compounds, they can be precipitated therefrom by means of basic lead acetate in the form of their insoluble lead salt. Thus, such phenyl benzo-γ-pyrone compounds can be precipitated in the form of aglycones as well as glycosides by neutral and basic lead acetate.

However, when attempting to fractionally precipitate the phenyl benzo-γ-pyrone compounds present in shrubs of the genus Crataegus by means of neutral and basic lead acetate, satisfactory separation of these compounds from each other is not possible. On the contrary, none of the precipitates obtained by means of said lead salts contains well-defined compounds. Furthermore, it is not possible to recover and isolate other compounds present in the solution remaining after removing the lead acetate precipitates.

It is one object of the present invention is to provide a simple and effective process of preparing phenyl benzo-γ-pyrone compounds substituted by hydroxy groups and their glycosides from extracts of shrubs of the genus Crataegus which process avoids and eliminates the difficulties encountered heretofore.

Another object of the present invention is to provide new and valuable phenyl benzo-γ-pyrone compounds substituted by hydroxyl groups and their glycosides.

Other objects of the present invention and advantageous features thereof will become apparent as the description proceeds.

In principle, the process according to the present invention consists in carrying out precipitation of the various phenyl benzo-γ-pyrone compounds by means of neutral and basic lead acetate by adjusting the solutions or extracts of shrubs of the genus Crataegus to specific predetermined hydrogen ion concentrations. According to said process the hydrogen ion concentration is varied step by step so that first precipitation is effected in acid medium, thereafter in a neutral medium, and finally in an alkaline medium. In this manner, it is possible to separate the various phenyl benzo-γ-pyrone compounds substituted by hydroxyl groups from each other and to precipitate said compounds in substantially pure form. It is quite surprising and could not at all be expected that it would be possible not only to precipitate the phenyl benzo-γ-pyrone compounds substituted by hydroxyl groups from extracts obtained from shrubs of the genus Crataegus but also to separate such compounds from each other and to recover them in substantially pure form without further extensive purification. Heretofore, neutral and basic lead salts were used only for removing ballast materials from plant extracts. Thereby, however, at the same time valuable active ingredients were removed and discarded because they were not separated from such ballast materials.

Another important advantage of the new process is that a new valuable compound can be prepared from extracts obtained from shrubs of the genus Crataegus by such step by step changing of the pH-value in the process according to the present invention.

The starting materials for the process according to the present invention are extracts of parts of shrubs of the genus Crataegus, especially their leaves, flowers, and fruits. Such extracts are prepared by extracting parts of said shrubs with water or with water-miscible organic solvents, such as water-miscible lower alcohols, ketones, or ethers and especially methanol. The extracts are then concentrated by evaporation in a vacuum at a low temperature and are preferably freed of the organic solvent. The resulting extracts represent highly fluid aqueous concentrated solutions.

The extract obtained in this manner is freed of chlorophyll precipitated by the addition of water and is concentrated by evaporation in a vacuum.

When using a water soluble lead salt such as the acetate for precipitation, the following reaction conditions have proved of advantage. The resulting concentrated solution is adjusted to a pH-value of about 4.0, preferably by the addition of acetic acid. A saturated aqueous solution of lead acetate is added thereto in such an amount that no more precipitation takes places. The lead precipitate is separated and is washed with water until it is substantially neutral. The filtrate and the wash waters are combined and are adjusted to a pH of about 7.0 by the addition of dilute alkali hydroxide solution. The resulting precipitate is removed by centrifuging and is washed.

The combined aqueous filtrate and wash waters are adjusted to a pH value of about 8.0 by the addition of alkali hydroxide solution. The precipitate is also removed and washed with water.

The combined aqueous filtrate and wash waters are finally adjusted to a pH of about 10.0 by the addition of alkali hydroxide solution. In order to complete precipitation, it is usually necessary to add at this stage a further amount of vinegar of lead, i.e. of an aqueous solution of basic lead acetate. The precipitate is again separated from the aqueous solution by centrifuging and is washed with water.

The resulting four lead precipitates are separately decomposed in aqueous suspension by the addition of phosphoric acid, sulfuric acid, or, preferably, of hydrogen sulfide. The precipitated insoluble lead salts (phosphate, sulfate, or sulfide) are removed from the aqueous solution and are carefully washed. The filtrates and the wash waters are combined and are concentrated by evaporation in a vacuum. The phenyl benzo-γ-pyrone compounds substituted by hydroxyl groups partly precipitate in the form of the aglycones or, respectively, of their glycosides as difficultly soluble substances on concentration by evaporation is a vacuum. The concentrated solutions are allowed to stand for some time and are then contrifuged. Compounds which are in solution in the mother liquors can be extracted therefrom by means of suitable solvents. Alcohols or esters with 4 or 5 carbon atoms which are of only limited solubility in water, are preferably used for extracting the mother liquors.

The filtrates obtained from the precipitates at a pH-value of 4.0 and, after decomposition of their lead salts, at a pH-value of 8.0 usually yield, on concentration by evaporation, the phenyl benzo-γ-pyrone compounds substituted by hydroxyl groups in crystalline form. In contrast thereto, the benzo-γ-pyrone compounds present in the filtrate of the decomposed lead precipitate at a pH value of 10.0 are characterized by a high solubility in water and are also extracted by means of suitable solvents so as to facilitate their recovery.

By proceeding in the above described manner and varying, step by step, the hydrogen ion concentration, it is possible to precipitate and prepare the phenyl benzo-γ-pyrone compounds substituted by hydroxyl groups from extracts of shrubs of the genus Crataegus in the form of their heavy metal complex compounds. The phenyl benzo-γ-pyrone compounds substituted by hydroxyl groups can be recovered from the filtrates of the decomposed heavy metal precipitates by concentrating said filtrates and, if required, by extracting the filtrates with suitable solvents.

The lead salts of the phenyl benzo-γ-pyrone compounds substituted by hydroxyl groups, as they are precipitated at various hydrogen ion concentrations, are characterized in their appearance by different coloration. Thus, the precipitate obtained at a pH of about 4.0, which shall be designated hereinafter as precipitate A, has a brown color, the precipitate obtained at a pH of about 7.0, designated as precipitate B, has an orange color, the precipitate obtained at a pH of about 8.0, designated as precipitate C, has a yellow color, and the precipitate obtained at the pH of about 10.0, designated as precipitate D, has a light yellow color.

When using other metal salts in place of the lead salts, such as water soluble cadmium salts or copper salts, the reaction conditions and the pH-values at which precipitation of the individual benzo-γ-pyrone compounds takes place, may vary. The most suitable pH-values can readily be determined by preliminary tests.

The following examples serve to illustrate the present invention without, however, limiting the same thereto.

*Example 1*

60 kg. of the leaves of the hawthorn shrub (*Crataegus oxyacantha*) are extracted twice with 100 liters of methanol, each time at 60° C. for about 15 minutes. The extract is separated from the extracted plant material by pressing. The combined extracts are concentrated by evaporation in a vacuum to a volume of about 20 liters. The same volume of water of about 40° C. is added, while stirring, to the resulting highly fluid concentrated extract. The mixture is allowed to stand for 24 hours. The precipitate which consists substantially of chlorophyll, is removed by centrifuging. The clear centrifuged solution is concentrated by evaporation to a volume of about 5 liters to 6 liters. 10% acetic acid is added thereto until the hydrogen ion concentration of the solution is 4.0. A saturated aqueous solution of 3 kg. of neutral lead acetate is then added while stirring. The resulting brown precipitate A is allowed to settle. As soon as the supernatant solution has become clear, the precipitate is removed by centrifuging and is thoroughly washed in the centrifuge with water containing acetic acid and being adjusted to a pH of 4.0. The washed precipitate A is worked up separately as will be described hereinafter.

The mother liquor and the wash waters obtained after removing the precipitate A are combined. Their pH-value is adjusted to a pH of 7.0 by the addition of 10% sodium hydroxide solution. Thereby, an orange precipitate B is obtained which is also removed from the mother liquor by centrifuging and is washed with water. Working up of the washed precipitate B also takes place separately as will be described hereinafter.

The neutral filtrate as well as the wash waters are adjusted to a pH of 8.0 by the addition of 10% sodium hydroxide solution. A yellow precipitate C is obtained which is separated from the mother liquor and washed with water as described hereinabove.

The wash waters are combined with the filtrate and the combined solutions are adjusted to a pH of 10.0 by the addition of 10% sodium hydroxide solution. Thereby a light yellow precipitate D is obtained which is separated from the mother liquor and washed as described hereinabove.

The four precipitates A, B, C, and D which are obtained by increasing step by step the pH-value of an extract obtained from the shrubs of the genus Crataegus contain four different phenyl benzo-γ-pyrone compounds which are substituted by hydroxyl groups. The precipitates A and C contain the aglycones quercetin of the melting point 312–314° C. or, respectively, vitexin of the melting point 264–265° C. while the precipitates B and D contain the glycosides hyperin, i.e. quercetin-3-galactoside of the melting point 237–238° C. or, respectively, vitexin-4-rhamnoside of the melting point 215° C.

The precipitated lead salts of said phenyl benzo-γ-pyrone compounds which are substituted by hydroxyl groups, are decomposed, for instance, by suspending them in water and introducing hydrogen sulfide into the suspension. Thereby, the aglycones and glycosides enter into solution while lead sulfide is precipitated. Decomposition of the lead precipitates can also be effected by the addition of sulfuric acid, phosphoric acid, or other anions which are capable of forming insoluble lead salts. Organic solvents which are water-miscible, or only partly water-miscible, or water immiscible may be present during decomposition whereby the aglycones and glycosides are dissolved.

The aqueous solutions or the solutions in organic solvents obtained after removing the precipitated insoluble lead salts, are concentrated by evaporation in a vacuum and yield the above mentioned pyrone compounds in a substantially pure state.

*Example 2*

The concentrated extract obtained from hawthorn leaves according to Example 1 is mixed with such an amount of methanol that a solution containing 50% by volume of methanol is produced. Said solution is adjusted to a pH of about 7.0 by the addition of sodium hydroxide solution. The sum of quercetin and its glycoside present in the resulting solution is determined and calculated as quercetin. A concentrated aqueous solution of cadmium acetate is added to the 50% methanol solution while stirring. The amount of cadmium acetate is calculated so that 1 g. of cadmium acetate is added for each 500 mg. of quercetin present in the solution. Thereby, a reddish orange precipitate is obtained. Glacial acetic acid is then added to the water-methanol mixture, while stirring, until the solution has a pH of 3.8–4.0. The acetic acid concentration of the mixture is about 1%. The volume of the precipitate is diminished by said addition of acetic acid and the color changes to yellow. The precipitate is removed by centrifuging and is washed with 30% methanol of which 100 cc. are used for each 500 mg. of quercetin. The washed and centrifuged precipitate is dried in a vacuum at 50° C. The residue has a melting point of 297–302° C. Subjecting the residue to paper chromatography in a mixture of butanol, glacial acetic acid, and water in the proportion of 4:1:5 yields one single spot with the $R_f$-value of 0.72. This spot corresponds to that of quercetin when subjected to chromatography under the same conditions.

The precipitate obtained after addition of cadmium acetate to the neutral methanolic solution (pH 7.0) may be worked up directly. For this purpose it is separated from the extract and suspended in aqueous 50% methanol. The pH-value of the resulting suspension is adjusted to a pH of 3.8–4.0 by the addition of glacial acetic acid. Quercetin glycoside is obtained from the filtrate and the wash waters obtained on washing the precipitate with 30% aqueous methanol. It is precipitated by adjusting the pH-value of the combined filtrate and wash methanol to a pH of about 7.0 and is separated from the mother liquor by centrifuging.

*Example 3*

The flavone content of the aqueous extract obtained from hawthorn leaves according to Example 1 is determined photometrically. An 0.1 molar aqueous cupric acetate solution is added to the extract after adjusting its pH-value to a pH of 5.0 by the addition of glacial acetic acid. 1 cc. of said cupric acetate solution is added for each mg. of phenyl benzo-γ-pyrone substituted by hydroxyl groups. A fine flocculent brown precipitate is obtained which is separated from the mother liquor by centrifuging and is washed with aqueous 30% methanol. The wash methanol is only very slightly colored and is combined with the mother liquor. The combined solutions are adjusted to a pH of about 7.0 by the addition of sodium hydroxide solution. The resulting green precipitate is separated from the mother liquor and is washed with 30% methanol. The filtrate and the wash waters are adjusted to a pH of about 11.0 by the addition of sodium hydroxide solution. Half of the previously added amount of cupric acetate solution is added to the alkaline solution while stirring. The resulting green precipitate is also separated from the mother liquor.

The precipitates obtained in this manner are separately worked up by suspending them in hot methanol and introducing hydrogen sulfide to decompose the copper salts. The brown precipitate obtained by precipitation at a pH of 5.0, yields the flavonol and the flavonol glycoside. They are separated into the aglycone and the glycoside by means of a suitable organic solvent such as diethyl ether. The precipitate obtained at a pH of 7.0 yields the flavone and the precipitate obtained at a pH of 11.0 the flavone glycoside.

It is also possible to separately precipitate the flavonol and the flavonol glycoside by first adjusting the pH value of the hawthorn extract to a pH of 4.0. Addition of cupric acetate precipitates a brown substance which consists substantially of the flavonol. On adjusting the hydrogen ion concentration of the filtrate and wash waters from said first precipitate to a pH of about 5.4 the flavonol glycoside precipitates, which can also be separated from the mother liquor. By further adjusting the pH values of the filtrates and wash waters to a pH of about 7.0, and subsequently to a pH of about 11.0, the flavone and the flavone glycoside are obtained as described hereinabove.

Suitable salts of other heavy metals than those used in the preceding examples, for instance, salts of bismuth and others may also be used for fractionally precipitating the various flavonol and flavone compounds obtainable from extracts of shrubs of the genus Crataegus. It is, of course, understood that only such heavy metal salts can be used which can readily be separated from the flavonol and flavone compounds by means of hydrogen sulfide or in any other manner by the formation of insoluble salts.

The flavonol and flavone compounds obtained according to the present invention are useful as therapeutic agents, for instance, for slowing the pulse rate, as diuretic agents, and for other purposes.

Of course, many changes and variations in the reaction conditions, the reaction temperature and duration, the concentration of the active ingredients in the extracts, the organic solvents added, the amounts of heavy metal salts, and the manner in which the precipitates are worked up and in which the flavonol and flavone compounds are purified, and the like may be made by those skilled in the art in accordance with the principles set forth herein and in the claims annexed hereto.

We claim:

1. In a process of producing 2-phenyl benzo-γ-pyrone compounds selected from the group consisting of quercetin, vitexin, and their monoglycosides, the steps which comprise diluting a concentrated methanol extract of leaves, flowers, and fruits of plants of the genus Crataegus with water to precipitate chlorophyll, removing said precipitate, concentrating the remaining filtrate, adjusting the concentrated filtrate to a pH of about 4.0 by the addition of acetic acid, adding thereto a saturated aqueous solution of neutral lead acetate, allowing the precipitate to settle, removing the precipitate containing the lead chelate of quercetin, adjusting the pH-value of the resulting filtrate to a pH of about 7.0, removing the precipitate containing the lead chelate of hyperin, adjusting the pH-value of the resulting filtrate to a pH of about 8.0, removing the precipitate containing the lead chelate of vitexin, adjusting the pH-value of the resulting filtrate to a pH of about 10.0, removing the precipitate containing the lead chelate of vitexin-4-rhamnoside, suspending the lead chelate precipitates, each separately, in hot methanol, introducing hydrogen sulfide into the resulting suspension, removing the precipitated lead sulfide, and isolating the respective 2-phenyl benzo-γ-pyrone compounds from the filtrates.

2. In a process of producing 2-phenyl benzo-γ-pyrone compounds selected from the group consisting of quercetin, vitexin, and their monoglycosides, the steps which comprise diluting a concentrated methanol extract of leaves, flowers, and fruits of plants of the genus Crataegus with water to precipitate chlorophyll, removing said precipitate, concentrating the remaining filtrate, adjusting the concentrated filtrate to a pH of about 4.0 by the addition of acetic acid, adding thereto a saturated aqueous solution of neutral lead acetate, allowing the precipitate to settle, removing the precipitate containing the lead chelate of quercetin, adjusting the pH-value of the resulting filtrate to a pH of about 7.0, removing the precipitate containing the lead chelate of hyperin, adjusting the pH-value of the resulting filtrate to a pH of about 8.0, removing the precipitate containing the lead chelate of vitexin, adjusting the pH-value of the resulting filtrate to a pH of about 10.0, removing the precipitate containing the lead chelate of vitexin-4-rhamnoside, suspending the lead chelate precipitates, each separately, in water, decomposing the suspended lead chelates by means of an anion forming a water insoluble lead salt, removing the precipitated water insoluble lead salt, and isolating the respective 2-phenyl benzo-γ-pyrone compounds from the filtrates.

3. In a process of producing 2-phenyl benzo-γ-pyrone compounds selected from the group consisting of quercetin, vitexin, and their monoglycosides, the steps which comprise adding water to an alcoholic extract of leaves, flowers, and fruits of plants of the genus Crataegus to precipitate chlorophyll, waxes, and fat present in said extract, removing said precipitate, adjusting the resulting solution to a pH of about 4.0, adding thereto a water soluble salt of a metal selected from the group consisting of lead, cadmium, copper, and bismuth to precipitate the metal chelate of quercetin, removing the resulting precipitate, stepwise adjusting the pH-value of the resulting filtrate from the acid pH of about 4.0 to a neutral pH and finally to a pH of about 10.0 to 11.0 and removing after each adjustment of the pH-value the resulting precipitates of the metal chelates of hyperin, vitexin, and vitexin-4-rhamnoside obtained thereby in said order with increasing pH-value, decomposing the resulting metal chelates of said 2-phenyl benzo-γ-pyrone compounds, each separately, to the corresponding metal free 2-phenyl benzo-γ-pyrone compounds, and isolating said 2-phenyl benzo-γ-pyrone compounds from the decomposition mixtures.

4. The process according to claim 1, wherein the methanol extract of leaves, flowers, and fruits of plants of the genus Crataegus is an extract of the leaves of the hawthorn shrub *Crataegus oxyacantha*.

5. The process according to claim 3, wherein the water soluble metal salt is lead acetate.

6. The process according to claim 3, wherein the water soluble metal salt is cadmium acetate.

7. The process according to claim 3, wherein the water soluble metal salt is cupric acetate.

References Cited in the file of this patent

UNITED STATES PATENTS

| | | |
|---|---|---|
| 2,152,827 | Szent-Gyorgyi | Apr. 4, 1939 |
| 2,534,250 | De Eds et al. | Dec. 19, 1950 |

FOREIGN PATENTS

| | | |
|---|---|---|
| 425,198 | Great Britain | Mar. 8, 1935 |
| 486,898 | Great Britain | June 13, 1938 |